United States Patent
Sylvester et al.

(10) Patent No.: US 12,221,003 B1
(45) Date of Patent: Feb. 11, 2025

(54) WIRELESS CHARGING SYSTEM FOR A ROAD

(71) Applicant: Integrated Roadways, LLC, Kansas City, MO (US)

(72) Inventors: Tim Sylvester, Kansas City, MO (US); Tiziano Pedersoli, Overland Park, KS (US)

(73) Assignee: Integrated Roadways, LLC, Chicago, IL (US)

( * ) Notice: Subject to any disclaimer, the term of this patent is extended or adjusted under 35 U.S.C. 154(b) by 0 days.

(21) Appl. No.: 18/145,061

(22) Filed: Dec. 22, 2022

(51) Int. Cl.
*B60L 53/30* (2019.01)
*B60L 53/126* (2019.01)
*B60L 53/36* (2019.01)
*B60L 53/66* (2019.01)

(52) U.S. Cl.
CPC .......... *B60L 53/305* (2019.02); *B60L 53/126* (2019.02); *B60L 53/36* (2019.02); *B60L 53/66* (2019.02)

(58) Field of Classification Search
CPC ...... B60L 53/305; B60L 53/126; B60L 53/36; B60L 53/66
See application file for complete search history.

(56) References Cited

U.S. PATENT DOCUMENTS

| | | | | |
|---|---|---|---|---|
| 9,027,723 B2* | 5/2015 | Niizuma | ................. | H02J 50/12 |
| | | | | 191/10 |
| 9,139,962 B2* | 9/2015 | Smith | ..................... | E01C 11/14 |
| 2011/0025267 A1* | 2/2011 | Kamen | ................. | B60L 53/665 |
| | | | | 320/109 |
| 2015/0303714 A1* | 10/2015 | Keeling | ................. | B60L 53/66 |
| | | | | 320/108 |
| 2019/0381903 A1* | 12/2019 | Shin | ..................... | G05D 1/0088 |
| 2023/0122088 A1* | 4/2023 | McCool | ................. | H02J 50/40 |
| | | | | 320/108 |

FOREIGN PATENT DOCUMENTS

CA      2609641 A1 * 11/2006 ............. B60L 5/005

* cited by examiner

*Primary Examiner* — Quan Zhen Wang
*Assistant Examiner* — Mancil Littlejohn, Jr.

(57) ABSTRACT

A wireless charging system for a road. The wireless charging system comprises a wireless communication transceiver embedded within the road. The wireless communication transceiver is configured to communicate with a vehicle traveling on the road. The wireless charging system additionally comprises a wireless power charger embedded within the road. The wireless power charger is configured to transmit energy wirelessly to the vehicle. The wireless power charger further comprises at least one control processor in communication with the wireless communication transceiver and the wireless power charge. The control processor is configured to control the wireless power charger based on data regarding the vehicle obtained from the wireless communication transceiver.

20 Claims, 5 Drawing Sheets

WIRELESS CHARGING SYSTEM FOR A ROAD

FIELD OF THE INVENTION

Embodiments of the present invention relate to wireless charging systems for roads. More particularly, embodiments of the present invention relate to a wireless charging system configured to sense when a vehicle is traveling on a road and to provide wireless charging to the vehicle in response.

BACKGROUND

Recent advances in electric motors and electrical power storage have facilitated an increase in the manufacture and use of electric vehicles, some of which implement autonomous and/or self-driving technologies. Previously, electric vehicles were dependent on being recharged at periodic or regular intervals. For example, for a daily-commuter electric vehicle, the vehicle's battery would generally be recharged at the operator's home overnight. Alternatively, for a long-haul electric vehicle, the vehicle's battery would generally be recharged periodically, at stops during the trip, once the battery level of the vehicle had been sufficiently depleted. Unfortunately, such periodic charging of electric vehicles is inconvenient and burdensome for the operator. For instance, the single charge range of the daily-commuter electric vehicle can place restrictions on how far the operator can commute each day. Similar inconveniences are present with the long-haul electric vehicle. Further, the charging time needed to recharge an electric vehicle once stopped at a charging station can necessitate a significant increase in travel time for the operator of the long-haul electric vehicle. Furthermore, many geographic locations have limited charging stations, which can make it difficult for electric vehicle operators to find suitable locations to charge.

In view of the above, it would be beneficial to provide charging systems that can recharge vehicles (e.g., the batteries of electric vehicles) during travel, so as to increase the range of the electric vehicles without requiring the additional time and cost associated with stopping the electric vehicles to recharge (e.g., at home, at work, or otherwise at charging stations). In particular, there is a need for wireless charging systems for roadways, which can wirelessly charge vehicles as the vehicles travel on the roadways.

SUMMARY OF THE INVENTION

Embodiments of the present invention address one or more of the above-mentioned problems and provide a distinct advance in the art of charging vehicles, and particularly electric vehicles. Specifically, embodiments of the present invention may provide a wireless charging system for a road. The wireless charging system comprises a wireless communication transceiver embedded within the road. The wireless communication transceiver is configured to communicate with a vehicle traveling on the road. The wireless charging system additionally comprises a wireless power charger embedded within the road. The wireless power charger is configured to transmit energy wirelessly to the vehicle. The wireless power charger further comprises at least one control processor in communication with the wireless communication transceiver and the wireless power charge. The control processor is configured to control the wireless power charger based on data regarding the vehicle obtained from the wireless communication transceiver.

Embodiments of the present invention may also provide a method of wirelessly charging a vehicle traveling on a road. The method comprises a step of sensing, via a wireless communications transceiver embedded within the road, the vehicle traveling on the road. The sensing step includes generating, via the wireless communications transceiver, data corresponding to the vehicle traveling on the road. An additional step includes providing the data to at least one control processor in communication with the wireless communications transceiver. A further step includes transmitting, via a wireless power charger embedded within the road, energy wirelessly to the vehicle. The transmitting step is controlled by the at least one control processor in communication with the wireless power charger, with the control processor being configured to control the wireless power charger based on the data generated by the wireless communications transceiver.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

The drawing figures do not limit the current invention to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Relational and/or directional terms, such as "above", "below", "up", "upper", "upward", "down", "downward", "lower", "top", "bottom", "outer", "inner", etc., along with orientation terms, such as "horizontal" and "vertical", may be used throughout this description. These terms retain their commonly accepted definitions and are used with reference to embodiments of the technology and the positions, directions, and orientations thereof shown in the accompanying figures. Embodiments of the technology may be positioned and oriented in other ways or move in other directions. Therefore, the terms do not limit the scope of the current technology.

Figure 1:
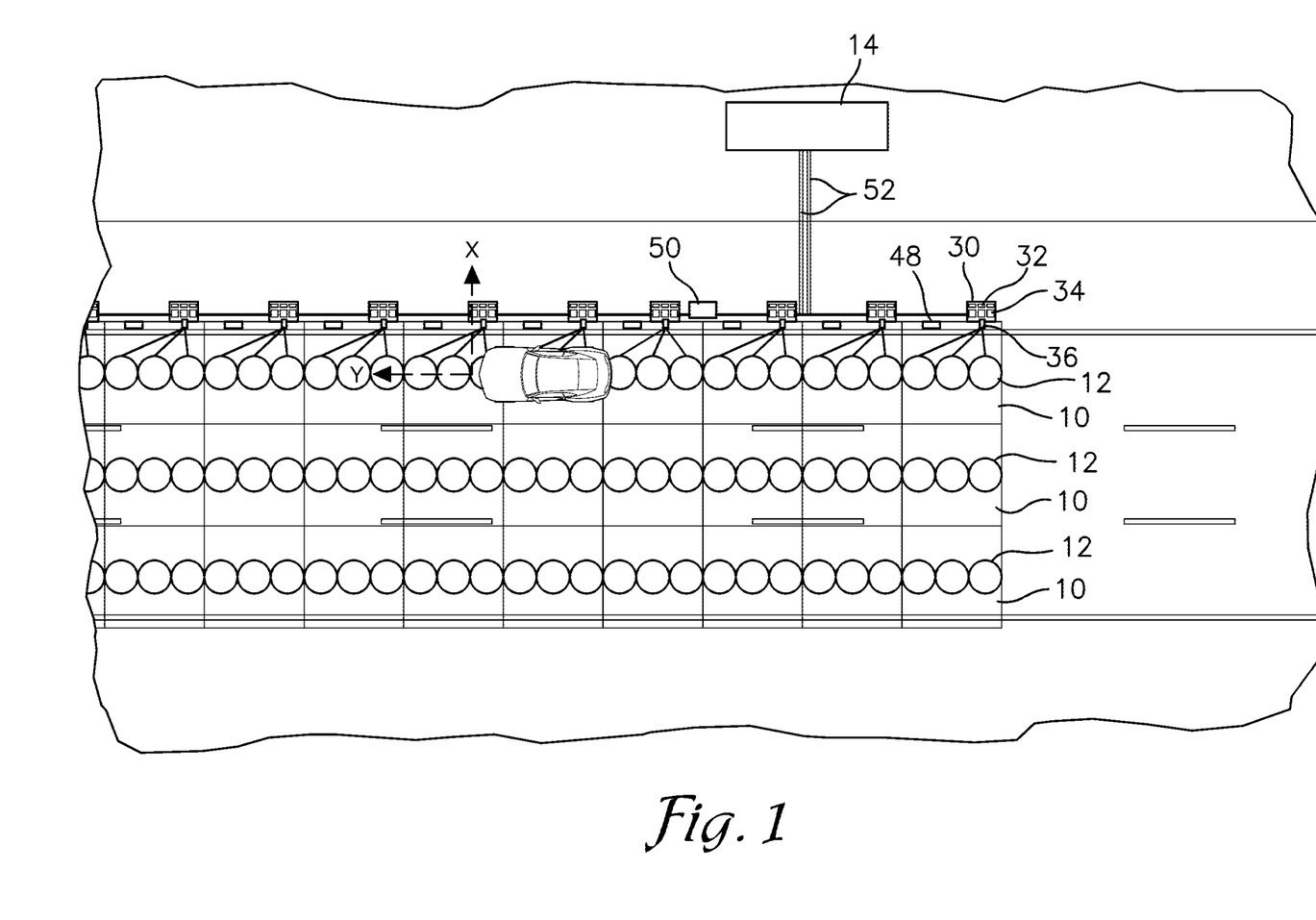
FIG. 1 is a top schematic view of a wireless charging system for a road according to embodiments of the present invention, particularly illustrating the system transmitting wireless power to a vehicle traveling on a surface of the road.

Embodiments of the present invention include a wireless charging system for a road. Such a wireless charging system and road may be described elsewhere herein as a "pavement system." FIG. 1 illustrates an exemplary pavement system in accordance with embodiments of the present invention. In more detail, the pavement system includes a plurality of roadway sections 10, illustrated in FIGS. 1-4, aligned along a longitudinal or y-axis corresponding to a direction of travel of vehicles or other masses across top surfaces of the roadway sections 10. The illustrative pavement system includes three (3) lanes, each being respectively formed from a plurality of roadway sections 10 aligned along the y-axis. Each lane may include one or more roadway sections 10. It is foreseen that the pavement system may include more or fewer lanes without departing from the spirit of the present invention.

The roadway sections 10 may be pre-cast slabs comprising concrete paving material, described in the exemplary embodiments in more detail below. It should be noted, however, that in one or more embodiments the pavement system may comprise one or more lanes formed of cast-in-place concrete installations, continuous pour asphalt pavement material, or other pavement types. In cast-in-place installations, roadway sections may include one or more lengths of roadway separated by saw cut joints, typically made to reduce the chances of roadway damage/cracking from cyclical expansion and contraction.

Figure 2:
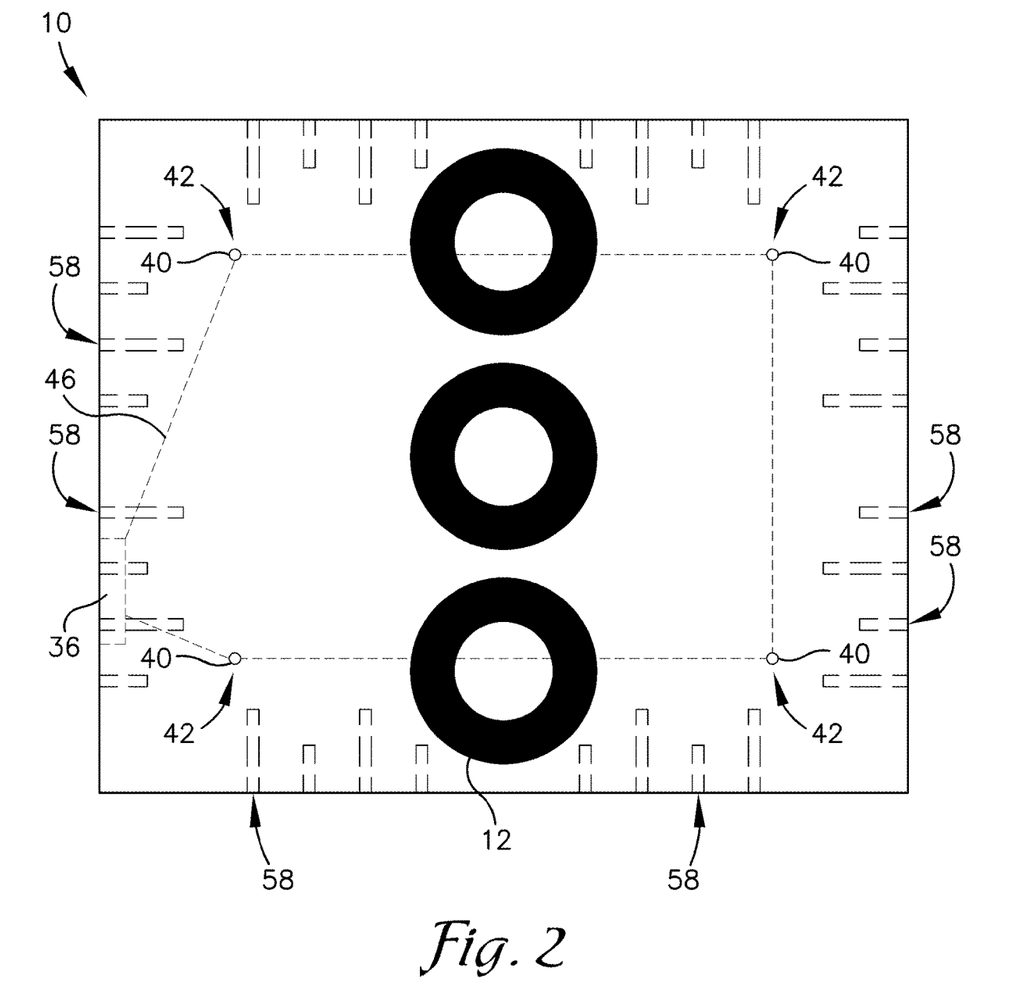
FIG. 2 is a top schematic view of a roadway section from the wireless charging system from FIG. 1, particularly illustrating wireless communications transceivers and a plurality of wireless power chargers embedded within the roadway section.

Each roadway section 10 of the illustrated embodiment may include three (3) wireless power chargers 12, as illustrated in FIGS. 1 and 2. The wireless power chargers 12 may include or comprise wireless charge emitters and/or transceivers. Each wireless charge emitter and/or transceiver preferably includes one or more inductive coil(s) or layers of conductive material configured to conduct current of supplied power in a spatial pattern that generates and projects an electromagnetic (EMF) field extending up and above the top surface of the corresponding roadway section 10 for wireless battery charging of passing vehicles (e.g., according to Faraday's law of induced voltage). Each of the wireless power chargers 12 may be configured for unidirectional charging of batteries of vehicles passing along a top surface of the roadway sections 10 or for bidirectional charging in communication with electrical circuits positioned on or adjacent to the top surface of the slabs. One of ordinary skill will appreciate that an individual slab or roadway section 10 may include more or fewer wireless power chargers 12, at different and/or variable spacing and/or of different configuration/shape, without departing from the spirit of the present invention.

Figure 5:
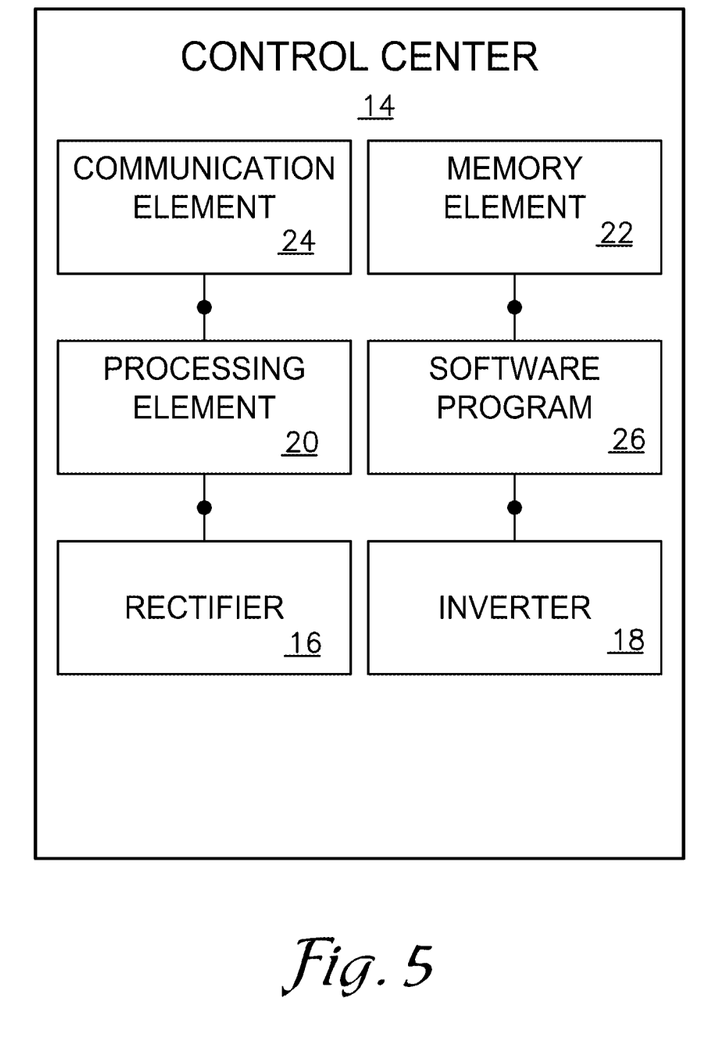
FIG. 5 is a schematic block diagram of a control center of the wireless charging system from FIG. 1.

Power to the wireless power chargers 12 is supplied, conditioned, tuned, transformed, converted and/or otherwise changed and/or controlled by one or more control centers 14, as illustrated in FIG. 1. Turning briefly to FIG. 5, each control center 14 may include a rectifier 16, an inverter 18, a processing element 20, a memory element 22, a communication element 24, and a software program 26, each of which is discussed in more detail below. It should also be noted that one or more components of a control center 14 may be housed remotely and/or embedded in or with components of a roadway section 10 without departing from the spirit of the present invention.

The control center 14 receives power from a power supply such as a public utility line and/or from upstream switchgear (not shown), and prepares same for supply to the wireless power chargers 12. For example, in one or more embodiments, the control center 14 receives alternating current (AC) power at 750 KW and 110 A, and increases the frequency of the power using the rectifier 16 and inverter 18 for supply to the wireless power chargers 12.

The control center 14 may initially supply power to junction boxes 30, which may each include one or more switching devices 32 and tuning network devices 34. The switching device(s) 32 and corresponding tuning network device(s) 34 may serve as intermediate components for electrical communication between the wireless power chargers 12 and the control center 14. One of ordinary skill will appreciate that more, fewer and/or different intermediate components may be used to supply power to the wireless power chargers 12 without departing from the spirit of the present invention. The exemplary junction boxes 30 are adjacent the sides of the corresponding roadway sections 10 and may be set or embedded in a shoulder of the roadway, with top portions approximately flush with the top surface of the roadway to provide periodic access thereto for maintenance.

In more detail, each junction box 30 may be configured to provide power from the control center 14 to at least one of the roadway sections 10. As such, each junction box 30 may contain or include one or more switching device(s) 32 and corresponding tuning network device(s) 34, with each pair of switching device 32 and tuning network device 34 supplying power to one of the wireless power chargers 12 of a given roadway section 10. Thus, for example, in embodiments in which the roadway sections 10 each include three (3) wireless power chargers 12, each junction box 30 may include three (3) pairs of switching devices 32 and tuning network devices 34. The switching device 32 may, for example, be a metal-oxide-semiconductor field-effect transistor (MOSFET) switch or any other switch device for switching and/or amplifying the power signal to the corresponding wireless power charger 12. The tuning network device 34 may, for example, be a transformer configured to increase or decrease the voltage and/or other characteristics of the power for supply to the corresponding wireless power charger 12. The wires or conductors carrying the power to the wireless power chargers 12 from the junction boxes 30 may be routed through one or more conduits and/or edge connectors 36 illustrated in FIGS. 1 and 2. In some embodiments, adjacent roadway sections 10 in different lanes (i.e., adjacent along the x-axis) may be connected via edge connectors 36, as shown in FIG. 2, such that a given junction box 30 may facilitate power distribution and/or communication with such adjacent roadway sections 10.

Returning to the control center 14, in one or more embodiments, the processing element 20, the memory element 22, the communication element 24 and/or the software program 26 comprise a master controller. The master controller may be in electronic communication (e.g., via the communication element 24) with one or both of the switching devices 32 and/or tuning network devices 34 (of the junction boxes 30) corresponding to each of the wireless power chargers 12 of the pavement system. The electronic communication may permit such electronic devices in each of the junction boxes 30 to provide data regarding operation and/or faults of the wireless power chargers 12 and/or supporting power supply or control infrastructure and/or intermediate components. The electronic communication may also or alternatively permit the master controller to communicate commands to the junction box 30 electronic components and/or components of the wireless power chargers 12, for example where the master controller commands one or more switching device(s) 32 to power or shut down power to the corresponding wireless power charger(s) 12 or commands one or more tuning network device(s) 34 to increase or decrease the voltage of the power supplied to the corresponding wireless power chargers 12.

Figure 3:
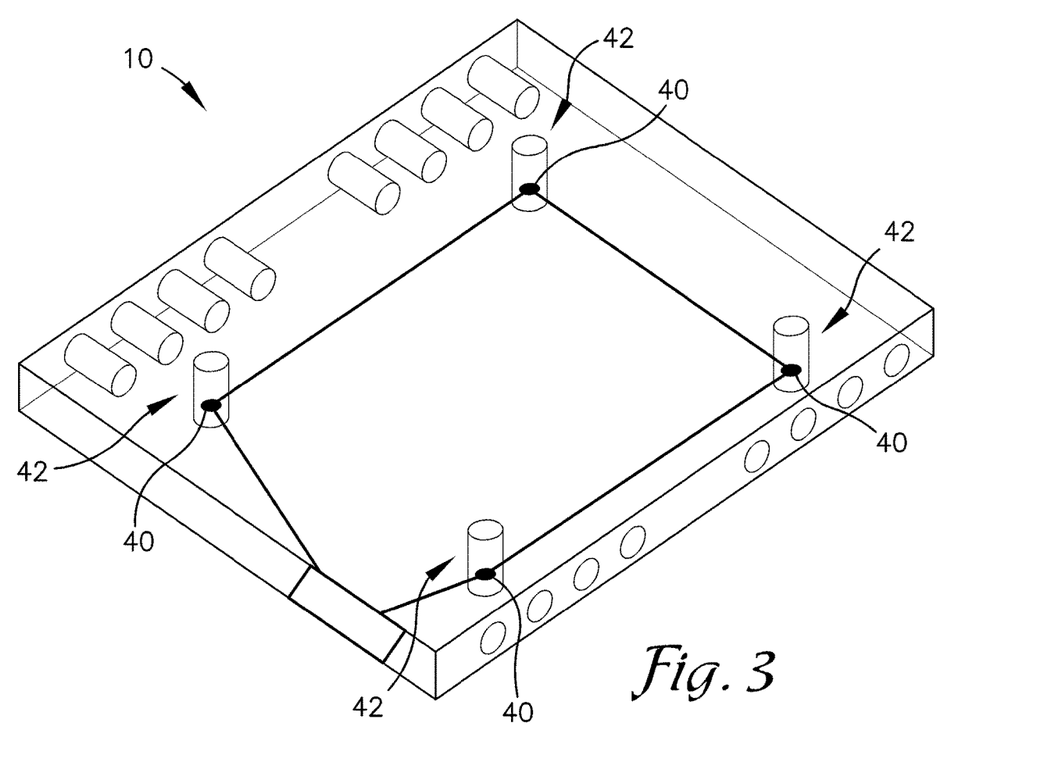
FIG. 3 is an elevated schematic view of a roadway section of the wireless charging system from FIGS. 1 and 2, particularly illustrating the wireless communications transceivers positioned within access ports formed through a thickness of the roadway section.

Turning to FIGS. 2 and 3, in one or more embodiments, each roadway section 10 includes at least one wireless communication transceiver 40 embedded within the roadway section 10. As will be described in more detail below, the wireless communication transceivers 40 are configured to communicate with vehicles traveling on the roadway section 10 and may, in some embodiments, be configured to determine, obtain, and/or generate position, velocity, and other operational data or information related to the vehicles. In some embodiments, each roadway section 10 will include one (1), two (2), three (3), four (4), or more wireless communication transceivers 40 embedded therein. In some embodiments, the wireless communication transceivers 40 may be located within openings formed within the roadway sections 10. For example, as illustrated in FIG. 3, each roadway section 10 may include four (4) access ports 42 formed within the roadway section 10, with each of the access ports 42 presenting an opening for housing one of the wireless communication transceivers 40.

In more detail, the access ports 42 may comprise cavities extending generally vertically at least partly through a thickness of the roadway section 10 (e.g., at least partially positioned below the upper surface of the roadway section 10). The access ports 42 and/or wireless communication transceivers 40 may be positioned at various locations with the roadway sections 10. However, in some embodiments, it is preferable for the access ports 42 and/or wireless communication transceivers 40 to be spaced apart throughout the roadway section 10 with one access port 42 (and one associated wireless communication transceiver 40 therein) located in each of four quadrants and/or corners of the roadway section 10.

One or more embodiments of the present invention may be compatible with embodiments described in U.S. patent application Ser. No. 17/471,470 to Sylvester, entitled SYSTEMS AND COMPUTER-IMPLEMENTED METHODS FOR ANALYZING TRANSFER OF FORCE THROUGH PAVEMENT SLABS and filed Sep. 10, 2021, which is hereby incorporated by reference in its entirety. For example, one or more embodiments of the transceivers may comprise and/or be positioned and/or seated/configured similarly to components illustrated in FIGS. 14A-E such as expansion module 240 within vertical cavity 236, and/or may be in electrical communication with and/or in contact with corresponding components illustrated therein and described in connection therewith (e.g., a plug/filler material and/or connector terminal 234).

As illustrated in FIGS. 1 and 2, the roadway sections 10 (which may be formed as concrete slabs) may be generally rectangular in shape, with the wireless power chargers 12 of a given roadway section 10 generally aligned with (and/or otherwise positioned adjacent to) a longitudinal centerline of the roadway section 10 (i.e., the longitudinal centerline extends through a center of the roadway section and is parallel with a y-axis of the road). Thus, with the access ports 42 and/or wireless communication transceivers 40 positioned in the corners of the roadway sections 10, the wireless communication transceivers 40 will be spaced away from the wireless power chargers 12 and/or will be radially outside of outermost edges or circumferences of each of the chargers 12 (e.g., in an XY plane), thereby avoiding interference with the EMF field generated above the top surface of the road by wireless power chargers 12. In certain specific embodiments, the wireless communication transceivers 40 will not be positioned above, or directly above (in a z-axis direction), the wireless power chargers 12 of the roadway sections 10 to ensure that interference with the generated EMF field is avoided.

Furthermore, in some particular embodiments, the access ports 42 may house embedded lifting receivers (not shown) to aid in installing or removing the roadway sections 10. Beneficially, by spacing the access ports 42 in each of the four quadrants of the roadway section 10, improved balance when moving the roadway section 10 can be achieved. Access ports 42 may also permit fluid communication between upper and bottom surfaces of the roadway section 10 and may be configured to house and/or provide access to other sensing equipment without departing from the spirit of the present invention.

One or more embodiments of the present invention may accordingly be compatible with embodiments described in U.S. Pat. No. 9,856,610 to Sylvester, entitled APPARATUS AND METHOD FOR SERVICING PAVEMENT and issued Jan. 2, 2018, which is hereby incorporated by reference in its entirety. For example, one or more embodiments of the transceivers may comprise and/or be positioned and/or seated/configured similarly to components illustrated in FIG. 2b such as sensor 16 within port 12, and/or may be seated adjacent receiver 14 and/or relative to grouting port 20, in each case as described in the aforementioned patent.

Embodiments of the present invention contemplate that the wireless communication transceivers 40 may be generally any type of wireless communications elements suitable to communicate with external systems or devices. As such, the wireless communication transceivers 40 may include signal and/or data transmitting and receiving circuits, such as antennas, amplifiers, filters, mixers, oscillators, digital signal processors (DSPs), and the like. The wireless communication transceivers 40 may establish communication wirelessly by utilizing radio frequency (RF) signals and/or data that comply with communication standards such as cellular 2G, 3G, 4G, LTE, or 5G, Institute of Electrical and Electronics Engineers (IEEE) 802.11 standard such as WiFi, IEEE 802.16 standard such as WiMAX, Bluetooth™, or combinations thereof. In addition, the wireless communication transceivers 40 may utilize communication standards such as ANT, ANT+, Bluetooth™ low energy (BLE), the industrial, scientific, and medical (ISM) band at 2.4 gigahertz (GHz), commercially available or customized Radio Frequency Identification (RFID), or the like. Alternatively, or in addition, the wireless communication transceivers 40 may establish communication through connectors or couplers that receive metal conductor wires or metal conductor cables which are compatible with networking technologies such as ethernet. In other embodiments, the wireless communication transceivers 40 may also couple with optical fiber cables.

In certain specific embodiments, the wireless communication transceivers 40 may comprise BLE sniffers, which are BLE transceivers configured to receive BLE signals generated and emitted from BLE beacons. Such BLE signals may include received signal strength indicator (RSSI) values, which comprise signal strength data indicative of the distance between the BLE beacons and the BLE sniffer. In certain embodiments, at least three (3) BLE sniffers (each spaced apart at different positions) are required to accurately triangulate a position of a BLE beacon via the BLE signals emanating from the BLE beacon. A more detailed description of such position-determining methodology using BLE signals is provided below.

Nevertheless, the total number, as well as the positions, of wireless communication transceivers 40 within a given roadway section 10, may be selected based at least in part on their respective intended utility and usage. For example, in connection with configuring a roadway section 10 to obtain information related to a vehicle passing over the roadway section 10, the number, size, and placement of the wireless communication transceivers 40 may be chosen to ensure the wireless communication transceivers 40 are capable of accurately detecting and identifying individual vehicles, as well as measuring the location of such vehicles.

Returning to embodiments in which the wireless communication transceivers 40 comprise BLE sniffers, the wireless communication transceivers 40 may be used to identify and determine a position of a vehicle traveling on the roadway. In such embodiments, the vehicle will include a transceiver that comprises a BLE beacon that continuously emits BLE signals. Also or alternatively, in one or more embodiments, an emitter on a vehicle will emit similar wireless signal(s) when induced to do so by proximity to one or more of the transceiver(s) 40. When the wireless communication transceivers 40 receive the BLE signals from the vehicle's BLE beacon, the wireless communication transceivers 40 may transmit the BLE signals (or data indicative thereof) to the control center 14, which may use the data to identify the vehicle and/or to determine a real-time and/or estimated future position of the vehicle (e.g., from the RSSI values included in the BLE signals). To accurately determine a position of the vehicle, certain embodiments require at least three (3) wireless communication transceivers 40 to be embedded within the roadway at regular, spaced apart locations within one or more of the roadway sections 10.

Figure 4:
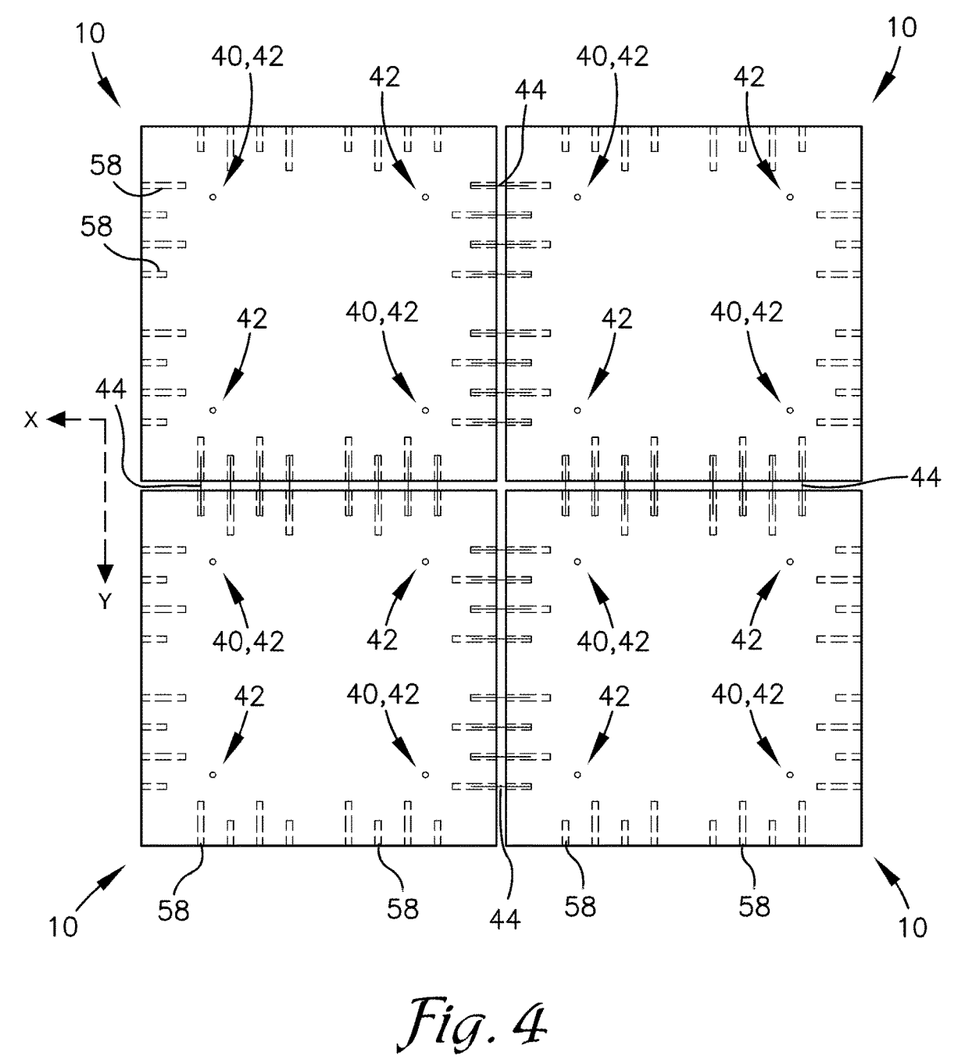
FIG. 4 is a top schematic view of four roadway sections interconnected via load-transferring connectors according to embodiments of the present invention, and further illustrating multiple wireless communications transceivers embedded within the four roadway sections.

For example, turning to FIG. 4, two lanes (extending in the x-axis direction) of roadway are shown, with each lane comprised of two roadway sections 10 (extending in the y-axis direction, which is the travel direction of the vehicle). As illustrated, each of the roadway sections 10 includes two wireless communication transceivers 40 embedded in the roadway section 10, and particularly positioned within access ports 42 formed in the quadrants/corners of the roadway sections 10. For example, one of the wireless communication transceivers 40 of a given roadway section 10 (which may be formed as a concrete slab) is located within an access port 42 positioned in a first corner of the roadway section 10 and a second of the wireless communication transceivers 40 is located within an access port 42 positioned in a second, opposite corner of the roadway section 10. The corners are opposite, such that the first corner and the second corner are connected by a diagonal of the generally rectangularly-shaped roadway section 10.

As was described earlier (and as illustrated in FIGS. 1 and 2), the wireless power chargers 12 of the roadway sections 10 are positioned adjacent to a longitudinal centerline of the roadway section 10 (in the y-axis direction or travel direction). Adjacent roadway sections 10 (in the y-axis direction or vehicle travel direction) each include wireless power chargers 12, with such wireless power chargers 12 all being generally aligned with the longitudinal centerline that extends through the center of both of such adjacent roadway sections 10. As such, the wireless communication transceivers 40 are each located laterally away from both (i) the longitudinal centerline, and (ii) the outer margins or circumferences of wireless power chargers 12 (as shown in FIGS. 2-4), such that the wireless communication transceivers 40 are not positioned above the wireless power chargers 12. In one or more embodiments, the wireless communication transceivers 40 are each located laterally away from the outer margins or circumferences of wireless power chargers 12 by at least three (3) inches, at least six (6) inches, or at least twelve (12) inches. As a result, the wireless communication transceivers 40 will not interfere with the EMF fields generated by the wireless power chargers 12, with such EMF fields extending above the top surfaces of the roadway sections 10.

Such positioning of the wireless communication transceivers 40 also beneficially permits accurate determinations of the positions of vehicles traveling on the roadway sections 10. Remaining with FIG. 4, each adjacent roadway section 10 includes two wireless communication transceivers 40 positioned in opposing corners of the roadway section 10. As such, each pair of adjacent roadway sections 10 (in the y-axis direction or vehicle travel direction) includes three (3) or more wireless communication transceivers 40 (and specifically four (4) wireless communication transceivers 40 in the illustrated example of FIG. 4) so as to be configured to accurately determine a position of a vehicle traveling on the roadway, as described in more detail below. For example, the nearest transceivers 40 of two (2) adjacent sections 10 may be positioned on laterally opposite sides of the sections 10 for provision of contrasting position data and enhanced vehicle location. In one or more embodiments, however, each roadway section 10 may include more than two (2) wireless communication transceivers 40. For instance, in some embodiments, each roadway section 10 may include four (4) wireless communication transceivers 40 (e.g., with one positioned in each corner of the roadway section 10).

In operation, the wireless communication transceivers 40 may be used to determine when and where a vehicle is traveling over a roadway associated with a wireless charging system, such that wireless power chargers 12 embedded within the roadway can be activated or tuned to transmit energy wirelessly to the vehicle to recharge the vehicle's battery. In more detail, a vehicle may include a communication element that is configured to communicate with the wireless communication transceivers 40 embedded within the roadway sections 10 of a roadway as the vehicle is traveling on the roadway. In some embodiments the vehicle's communication elements may comprise one or more BLE beacons configured to emit BLE signals that include RSSI values. As the vehicle travels over the roadway, the wireless communication transceivers 40, which may comprise BLE sniffers, may receive the BLE signals emitted from the vehicle to determine a real-time position of the vehicle on the roadway. In one or more embodiments, the control center 14 stores data mapping each transceiver 40 to a spatial position along the sections 10 and to a unique signal identifier or key.

Specifically, the wireless communication transceivers 40 may receive the BLE signals from the vehicle and transmit such BLE signals and/or the RSSI values associated with such BLE signals (or data indicative of such BLE signals and/or of such RSSI values), along with a unique identifier assigned to each of the transceivers 40, to the control center 14 for processing. Specifically, the control center 14 may compare, using the processing element 20 of the control center 14, the BLE signals (or data indicative thereof) received from the wireless communication transceivers 40, along with data regarding the location of each transceiver 40, and perform triangulation calculations to determine the real-time and/or future position of the vehicle on the roadway based on triangulation calculation.

Because an accurate triangulation calculation generally requires three separate BLE signals (or data indicative thereof), it is generally preferable that at least three (3) separate wireless communication transceivers 40 are used to obtain BLE signals from the vehicle to accurately calculate the real-time and/or future position of the vehicle. Based on the triangulation calculations and the determined position of the vehicle, the processing element 20 of the control center 14 will cause those specific wireless power chargers 12 within the road (within the particular roadway section 10 on which the vehicle is positioned or within a downstream roadway section 10) to generate an EMF field over the top surface of the roadway, to thereby induce wireless charging in the vehicle as the vehicle is traveling on the roadway. Thus, the wireless charging of the vehicle's battery by the wireless power chargers 12 is responsive to the determination of the vehicle's position on the road, with such position being determine by the control center 14 using the data collected by the wireless communication transceivers 40 embedded within the roadway.

In one or more embodiments, the control center 14 may calculate a plurality of positions along the roadway in this manner and from the calculated positions may calculate an estimated velocity. The control center 14 may select one or more wireless power charger(s) 12 to activate in one or more downstream sections 10 based at least in part on such an estimated velocity and estimated future position of the vehicle.

In some additional embodiments, the vehicle's communication element may be able to transmit other information to the control center 14, via the wireless communication transceivers 40 embedded within the roadway sections 10 of the roadway. For instance, in some embodiments, not all vehicles traveling on the roadway will be eligible to receive wireless charging from the wireless charging system. For instance, the eligibility of a vehicle to receive wireless charging may be based on or determined from a valid key (e.g., an identifier, such as word, name, number, code, or other identifier) stored in a memory element associated with the vehicle. As the vehicle travels on the road, the wireless communication transceivers 40 embedded within the road will sense, e.g., via triangulation discussed above, that the vehicle is traveling on the road. The wireless communication transceivers 40 may also attempt to communicate with the communication element of the vehicle to determine if the vehicle is eligible/authorized to receive wireless charging. If the vehicle provides appropriate eligibility information (e.g., a valid key), the processing element 20 of the control center 14 will cause the wireless power charger 12 within the road (within the particular roadway section 10 or within a downstream roadway section 10) to generate an EMF field to induce wireless charging in the vehicle. In contrast, if the vehicle does not provide appropriate eligibility information, the control center 14 will not cause wireless charging to be provided to the passing vehicle.

Similarly, in some embodiments, the wireless charging system may be configured to provide wireless charging to a vehicle based on a battery status of the vehicle. For example, vehicle batteries that are more than fifty percent (50%) charged may be considered "sufficiently charged" and not in need of wireless charging by the wireless charging system. In contrast, vehicle batteries that are less than fifty percent (50%) charged may be considered "insufficiently charged" and, thus, in need of wireless charging by the wireless charging system. As a result, in some embodiments, as the vehicle is traveling on the roadway, the vehicle's communication element may transmit the current battery status of the vehicle to the wireless communication transceivers 40. Based on such battery status, the wireless charging system may (or may not) provide wireless charging to the vehicle. For example, if the vehicle's battery status (as transmitted to the wireless communication transceivers 40) is "insufficiently charged," the processing element 20 of the control center 14 will cause one or more of the wireless power chargers 12 within the road (within the particular roadway section 10 or within a downstream roadway section 10) to generate EMF field(s) to induce wireless charging in the vehicle, responsive to the vehicle's battery status. In contrast, if the vehicle's battery status is "sufficiently charged," the control center 14 will not cause wireless charging to be provided to the passing vehicle. In some embodiments, a combination of two or more of the above-described criteria (e.g., triangulated position of the vehicle, vehicle eligibility, and vehicle battery status) may be used to determine whether or not and/or along which roadway section(s) to provide wireless charging to the vehicle. Furthermore, it is contemplated that other criteria associated with the vehicle and/or of the wireless charging system may be used to determine whether or not to provide wireless charging to the vehicle Regardless, the wireless communication transceivers 40 may establish direct and/or indirect communication(s) with vehicles for transmitting raw and/or processed data. Such data may be used in connection with autonomous and/or self-driving technologies (e.g., Level 4 autonomous driving). In an embodiment, one or more of the wireless communication transceivers 40 may continuously or periodically transmit such data—i.e., regarding objects and/or vehicles present on the roadway section 10 (e.g., position, velocity, weight, etc.)—to one or more autonomous vehicles to support automated navigation. In a more particular embodiment, data obtained via the wireless communication transceivers 40 of a system of roadway section 10 may comprise and/or be integrated into vehicular location, positioning, navigation, telemetry, or obstacle avoidance systems to provide and/or improve accuracy of positional data in support of autonomous driving operations.

In addition, the wireless communication transceivers 40 may receive data and/or information from vehicles implementing autonomous and/or self-driving technologies that are in the vicinity of, or traveling upon, the corresponding roadway section 10. The data and/or information may include velocity and/or heading information, vehicle identification information, and the like. The data and/or information may be utilized by the roadway section 10 for verification purposes, fault detection or correction purposes, and the like. Additionally, or alternatively, the data and/or information may be transferred to other roadway sections 10 in the vicinity or in the direction of travel of the vehicle.

With further reference to FIG. 4, the roadway sections 10 of the illustrated embodiment also include structural links comprising load-transferring connectors 44 (e.g., dowel rods), discussed in more detail below. However, it should be noted that the paving material of the roadway and delineations between sections 10 or sensing volumes, and associated structural components, may vary within the scope of the present invention. For example, cast-in-place concrete sections delineated by saw cut joints (e.g., without load-transferring connectors), or continuous pour installations (e.g., comprising asphalt without reinforcement layers or load-transferring connectors) are also within the scope of the present invention. An advantage of the precast roadway sections 10 of the illustrated embodiment is realized through added data dimensionality available through monitoring vehicles using multiple sets of wireless communication transceivers 40, respectively corresponding to multiple roadway sections 10 interconnected with load-transferring connectors 44 extending therebetween.

While it is foreseen, as noted above, that embodiments of the present invention may be constructed in the field—for example as part of cast-in-place concrete or continuous pour asphalt installations—or be pre-fabricated into an assembly that can be installed onsite, it is preferred that the wireless communication transceivers 40 be installed within the body of the roadway section 10 during an offsite pre-fabrication process. It is foreseen that a preferable arrangement of wireless communication transceivers 40 within a roadway section 10 may be provided based on the sensing requirements of the roadway. For instance, each wireless communication transceiver 40 in a given roadway section 10 may be specifically positioned and oriented to improve detection of the longitudinal (e.g., y-axis) or lateral (e.g., x-axis) position of the vehicle traveling on the road. In some embodiments, the wireless communication transceivers 40 of a given roadway section 10 will be configured in a sensor layout presenting a grid of wireless communication transceivers 40 oriented in the traverse and longitudinal dimensions such that their sensing areas overlap each other along the x and y axes to ensure that a maximum area of the surface of the roadway section 10 can be sensed simultaneously by one or more wireless communication transceivers 40 (e.g., oriented to the direction of travel and/or lateral position of the vehicle load on the roadway section 10). Furthermore, individual wireless communication transceivers 40 may be encased at different and/or varying heights within a slab without departing from the spirit of the present inventive concept. For instance, disposing at least one wireless communication transceivers 40 at a different height within the roadway section 10—such as vertically above or below a second wireless communication transceivers 40—may provide additional resolution for detecting defects in the roadway section 10. Nevertheless, it is generally contemplated that the placement of the wireless communication transceivers 40 should be such that the wireless communication transceivers 40 do not interfere with the EM fields generated above the top surface of the roadway by the wireless power chargers 12.

As noted above, in one or more embodiments, load-transferring connectors 44 (see FIG. 4) may be set in cavities 58 formed in the roadway sections 10 to join the roadway sections 10 to one another (or other adjacent structures) along sides extending perpendicular to the direction of travel (i.e., in the "x" direction). In one or more embodiments, load-transferring connectors 44 also join the roadway sections 10 to one another (or other adjacent structures) along sides extending parallel to the direction of travel (i.e., in the "y" direction). The load-transferring connectors 44 may comprise, for example, dowel rods. However, in one or more embodiments, roadway sections 10 adjacent one another in the "x" direction may be joined using tie bars (not shown) or other load-transferring connectors. Interfaces between roadway sections 10 may also or alternatively incorporate a rubber skirt, backer board, spacing rod, tar mixture, grouting or similar buffering substance within the scope of the present invention. It is also foreseen that load-transferring connectors may be omitted along one or more sides of slabs or roadway sections without departing from the spirit of the present invention.

Returning to FIG. 1, the master controller of the control center 14 may be in electronic communication (e.g., via wired connections, 46 of FIG. 2) with and may receive vehicle position data (e.g., indicative of RSSI values from BLE signals) from the wireless communication transceivers 40 embedded in the roadway sections 10. The wired connections 46 may be routed via edge connectors 36 through one or more junction boxes 50 illustrated in FIG. 1 for communication to the master controller (i.e., the control center 14). The master controller may communicate with and/or provide power to the components of the pavement system via wired connections 52. As such, the master controller may analyze the vehicle position data, alone and/or in communication with one or more remote server(s), to determine vehicle position on the pavement system and roadway sections 10 and, accordingly, provide commands for activation/deactivation of the wireless power chargers 12 and/or increasing or decreasing the voltage supplied to the wireless power chargers 12.

The communication element 24 generally allows communication with systems or devices external to the control center 14. The communication element 24 may include signal or data transmitting and receiving circuits, such as antennas, amplifiers, filters, mixers, oscillators, digital signal processors (DSPs), and the like. The communication element 24 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth™, or combinations thereof. Alternatively, or in addition, the communication element 24 may establish communication through connectors or couplers that receive metal conductor wires or cables which are compatible with networking technologies such as ethernet. The communication element 24 may also couple with optical fiber cables, e.g., via an interrogator. The communication element 24 may be in communication with or electronically coupled to memory element 22 and/or processing element 20.

Preferably the devices of the pavement system communicate via secure and/or encrypted communication means. For example, all or some of the roadway sections 10, the control center 14 and remote server(s) may securely exchange transmissions using DES, 3DES, AES-128 or AES-256 encryption and/or RSA (748/1024/2048 bit) or ECDSA (256/384 bit) authentication. It is foreseen that any means for secure exchange may be utilized without departing from the spirit of the present invention.

The memory element 22 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element 22 may include, or may constitute, a "computer-readable medium." The memory element 22 may store the instructions, code, code segments, software, firmware, programs, applications, apps, services, daemons, or the like that are executed by the processing element 20, such as the software program 26. The memory element 22 may also store settings, data, documents, files, photographs, movies, images, databases, and the like, for example where such data is captured by additional infrastructure sensors and/or relates to utilization of the wireless power chargers 14 by passing vehicles.

The processing element 20 may include processors, microprocessors, microcontrollers, DSPs, field-programmable gate arrays (FPGAs), analog and/or digital application-specific integrated circuits (ASICs), or the like, or combinations thereof. The processing element 20 may include digital processing unit(s). The processing element 20 may generally execute, process, or run instructions, code, code segments, software, firmware, programs, applications, apps, processes, services, daemons, or the like. The processing element 20 may also include hardware components, such as finite-state machines, sequential and combinational logic, and other electronic circuits that may perform the functions necessary for the operation of embodiments of the present invention. For example, the processing element 20 may execute the software program 26, where the software program 26 includes computer-readable instructions instructing the processing element 20 to complete all or some of the steps described herein. The processing element 20 may be in communication with the other electronic components through serial or parallel links that include address busses, data busses, control lines, and the like.

In view of the above, embodiments of the present invention are configured to sense when a vehicle is travelling over the road and wirelessly charge the vehicle in response to such sensing. In particular, embodiments of the present invention include at least one wireless communication transceiver 40 embedded within the road, with the wireless communication transceiver 40 being configured to generate data indicative of a position of a vehicle passing and/or driving on the top surface of the road. Thus, the wireless communication transceiver 40 is configured to sense when a vehicle is traveling on the road.

Embodiments additionally include a wireless power charger 12 embedded within the road, with the wireless power charger 12 being configured to induce wireless charging in the vehicle. Embodiments further include at least one control processor, such as processing element 20 of the control center 14, in communication with wireless communication transceiver 40 and the wireless power charger 12. As such, the control processor is configured to control the wireless power charger 12 (e.g., activate or deactivate the wireless power charger 12) based on the data received from the wireless communication transceiver 40. Specifically, for example, when the wireless communication transceiver 40 senses that the vehicle is (or will soon be) traveling on the road, and particularly on the roadway section 10 within which the wireless communication transceiver 40 is embedded, the control processor can instruct the wireless power charger 12 (within the particular roadway section 10 or within a downstream roadway section 10) to generate an EMF field to induce wireless charging in the vehicle. Specifically, the wireless power charger 12 can generate the EMF field upward above the top surface of the road to be received by the inductive components associated with the vehicle to cause wireless charging of the vehicle's battery. Furthermore, in some embodiments, the wireless communication transceiver 40 is not positioned directly above the wireless power charger 12, such that the wireless communication transceiver 40 will not interfere with the EMF field generated by the wireless power charger 12.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112 (f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A wireless charging system for a road, said wireless charging system comprising:
   a wireless communication transceiver embedded within the road, wherein the wireless communication transceiver is configured to communicate with a vehicle traveling on the road;
   a wireless power charger embedded within the road, wherein the wireless power charger is configured to transmit energy wirelessly to the vehicle; and
   a control center comprising at least one control processor and a memory element, the control center being adapted and configured to execute a software program to control the wireless charging system, the control center being in communication with the wireless communication transceiver and the wireless power charger via a junction box having a switching device and a tuning network device, and wherein the control processor is configured to control the wireless power charger based on data regarding the vehicle obtained from the wireless communication transceiver, and the control center is adapted and configured to command the switching device to power or shut down power to the wireless power charger or to command the tuning network device increase or decrease the voltage of the power supplied to the wireless power charger.

2. The wireless charging system of claim 1, wherein the wireless communication transceiver comprises a low energy short-link radio transceiver.

3. The wireless charging system of claim 2, wherein the low energy short-link radio transceiver is configured to generate data indicative of a position of the vehicle travelling on the road.

4. The wireless charging system of claim 1, wherein the control processor is configured to instruct the wireless power charger to transmit energy wirelessly to the vehicle based on a position of the vehicle indicated by the wireless communication transceiver.

5. The wireless charging system of claim 1, wherein the control processor is configured to instruct the wireless power charger to transmit energy wirelessly to the vehicle based on a vehicle battery status of the vehicle received by the wireless communication transceiver.

6. The wireless charging system of claim 1, wherein the road includes a concrete slab.

7. The wireless charging system of claim 6, wherein the concrete slab comprises a cast-in-place slab.

8. The wireless charging system of claim 6, wherein the slab comprises a precast slab in which the wireless communication transceiver and the wireless power charger are embedded, further comprising a plurality of load-transferring connectors embedded along a side of a plurality of sides of the precast slab, the plurality of load-transferring connectors being attached to an adjacent structure and configured to transfer load on the precast slab corresponding to the passing vehicles between the precast slab and the adjacent structure.

9. The wireless charging system of claim 6, wherein the concrete slab includes at least one access port housing the wireless communication transceiver.

10. The wireless charging system of claim 9, wherein the access port is vertically oriented.

11. The wireless charging system of claim 6, wherein the concrete slab is generally rectangular.

12. The wireless charging system of claim 11, further comprising at least one additional wireless communication transceiver, wherein one of the wireless communication transceivers is positioned in a first corner of the concrete slab and another of the wireless communication transceivers is positioned in a second corner of the concrete slab, wherein the first corner and the second corner are connected by a diagonal of the rectangular concrete slab.

13. The wireless charging system of claim 12, wherein the control processor is configured to generate data reflecting a vehicle position of the vehicle based on triangulation calculations using signals received by the wireless communication transceivers and to instruct the wireless power charger to transmit energy wirelessly to the vehicle based on the triangulated vehicle position.

14. The wireless charging system of claim 12, wherein the wireless power charger is positioned adjacent to a centerline of the rectangular concrete slab and the wireless communication transceivers are not positioned above the wireless power charger.

15. The wireless charging system of claim 1, wherein the road includes two adjacent rectangular concrete slabs, and wherein a longitudinal centerline extends through a center of both of the two concrete slabs.

16. The wireless charging system of claim 15, wherein each of the two concrete slabs includes at least one wireless power charger, including the wireless power charger, and wherein the wireless power chargers are aligned with the longitudinal centerline.

17. The wireless charging system of claim 16, wherein each of the two concrete slabs includes at least two wireless communication transceivers, including the wireless communication transceiver, the at least two wireless communication transceivers of each of the two concrete slabs being positioned in opposing corners of the respective concrete slabs.

18. The wireless charging system of claim 17, wherein the wireless communication transceivers are configured to cooperatively receive signals indicative of a position of the vehicle travelling over the road and the control processor is configured to generate data providing the vehicle position of the vehicle based on triangulation calculations using the signals received by the wireless communication transceivers.

19. The wireless charging system of claim 18, wherein the control processor is configured to instruct the wireless power chargers to transmit energy wirelessly to the vehicle based on the triangulated vehicle position.

20. A method of wirelessly charging a vehicle traveling over a road, said method comprising the steps of:
(a) sensing, via a wireless communication transceiver embedded within the road, the vehicle traveling on the road, wherein said sensing of step (a) includes generating, via the wireless communications transceiver, data corresponding to the vehicle traveling on the road;
(b) providing the data to at least one control processor in communication with the wireless communications transceiver;
(c) commanding, via the at least one control processor, a junction box having a switching device and a tuning network device to power a wireless power charger embedded within the road, the wireless power charger being operatively connected to the junction box;
(d) tuning, via the tuning network device, the voltage of the power supplied to the wireless power charger; and
(e) transmitting, via the wireless power charger embedded within the road, energy wirelessly to the vehicle, wherein said transmitting of step (e) is controlled by the at least one control processor in communication with the wireless power charger, wherein the control processor is configured to control the wireless power charger based on the data generated by the wireless communication transceiver.

* * * * *